(12) United States Patent
Heim

(10) Patent No.: US 11,907,776 B2
(45) Date of Patent: Feb. 20, 2024

(54) INTEGRATED ASYNCHRONOUS ACCESS INTERFACE FOR DATA RETRIEVAL FROM DISTRIBUTED DATA SOURCES

(71) Applicant: Target Brands, Inc., Minneapolis, MN (US)

(72) Inventor: Kenneth Joseph Heim, Minnetonka, MN (US)

(73) Assignee: Target Brands, Inc., Minneapolis, MN (US)

( * ) Notice: Subject to any disclaimer, the term of this patent is extended or adjusted under 35 U.S.C. 154(b) by 53 days.

(21) Appl. No.: 17/687,040

(22) Filed: Mar. 4, 2022

(65) Prior Publication Data

US 2023/0281065 A1    Sep. 7, 2023

(51) Int. Cl.
*G06F 16/2458* (2019.01)
*G06F 16/27* (2019.01)
*G06F 9/54* (2006.01)

(52) U.S. Cl.
CPC .......... *G06F 9/547* (2013.01); *G06F 16/2471* (2019.01); *G06F 16/27* (2019.01)

(58) Field of Classification Search
CPC ....... G06F 16/27; G06F 16/2471; G06F 9/547
USPC ......................................................... 707/770
See application file for complete search history.

(56) References Cited

U.S. PATENT DOCUMENTS

| | | | |
|---|---|---|---|
| 7,503,052 B2 | 3/2009 | Castro et al. | |
| 7,822,825 B2 | 10/2010 | De Luca et al. | |
| 10,664,487 B2 | 5/2020 | Bruce et al. | |
| 10,685,019 B2 | 6/2020 | Svec | |
| 10,984,011 B1* | 4/2021 | Bishop | G06F 9/5083 |
| 11,055,193 B2 | 7/2021 | Dageville et al. | |
| 2018/0322168 A1* | 11/2018 | Levine | G06F 16/2471 |

FOREIGN PATENT DOCUMENTS

WO    2018170276 A3    2/2019

OTHER PUBLICATIONS

Salesforce.com (https://www.salesforce.com/products/marketing-cloud/customer-data-platform/?d=cta-body-promo-437): Salesforce customer data platform is a marketing tool for organizing customer data.
Snowflake.com (https://www.snowflake.com/workloads/data-lake/): Snowflake is a data management platform that allows for storing and searching of all stored data.

\* cited by examiner

*Primary Examiner* — Robert W Beausoliel, Jr.
*Assistant Examiner* — Lauren Zannah Ganger
(74) *Attorney, Agent, or Firm* — Merchant & Gould P.C.

(57) ABSTRACT

An integrated asynchronous interface for data retrieval from across a plurality of data sources is described. An interface may include a plurality of Application Programming Interfaces (APIs) as well as a database for constructing responsive data. A search request may be decomposed at the interface to sub-search requests to be distributed to multiple data sources via a search request API. Data responsive to the sub-search requests may be aggregated at an interface database. A status API may maintain a status of the search request, and can update a tenant regarding the status of the tenant's search request. A response API may be used to provide reconstructed data responsive to the search request from the interface database to the tenant.

20 Claims, 8 Drawing Sheets

INTEGRATED ASYNCHRONOUS ACCESS INTERFACE FOR DATA RETRIEVAL FROM DISTRIBUTED DATA SOURCES

BACKGROUND

Often, to provide enhanced services to online customers of a retailer, the retailer may wish to query its own databases about previous transactions associated with that customer or customers, to provide a customer with an enriched experience (e.g., for example providing specific product recommendations or displaying specific information to that user that may be relevant to the user). This can be completed on any individual user basis, or on the basis of a group of users.

Typically, within a retail organization, customer data may be stored in many databases, such as sales data or attributes associated with customers. A complex query may be received at the time a particular customer or set of customers visits the retail website. For example, a query may request a list of customers who meet a particular type of criteria, and that information may be used to decide what supplemental, recommendation content is presented. A query such as this is complex, and usually requires separate queries issued to separate databases maintained by the retailer, and significant time to execute.

Because storage of sales, customer identity, and marketing data together in the same database is both unwieldy and impractical due to privacy and security reasons, it is desirable to improve the performance of such complex queries while maintaining underlying data within separate data collections.

SUMMARY

In general, the present disclosure relates to an integrated asynchronous interface for data retrieval from across a plurality of data sources. In example embodiments, an interface may include a plurality of Application Programming Interfaces (APIs) as well as a database for constructing responsive data. A search request may be decomposed at the interface to sub-search requests to be distributed to multiple data sources via a search request API. Data responsive to the sub-search requests may be aggregated at an interface database. A status API may maintain a status of the search request, and can update a tenant regarding the status of the tenant's search request. A response API may be used to provide reconstructed data responsive to the search request from the interface database to the tenant.

In example aspects, the interface may be particularly applicable in large scale data environments in which searches are performed across a plurality of unaffiliated databases and may touch a large number of records. In some implementations, customer data may be retrieved using such an interface for one customer, or multiple customers sharing a predetermined attribute or attributes. The customer data may be held in a variety of databases, such as a user profile database, a transaction database (e.g., prior purchases by the user), a contact history, and the like. Given the wide variety of databases where such data is held, the asynchronous nature of the interface, combined with the standardized APIs provided, simplify the process of obtaining such data by tenant applications.

In a first aspect, a method for asynchronously performing search requests across a plurality of databases is disclosed. The method includes receiving a search request from a tenant computing device at a search interface including a search request API, the search interface being hosted by a computing system comprising a processor, and transmitting, by the search request API, the search request to a first database. The method also includes creating, by a status API, and separating, by the processor, the search request into individual search attributes. The method further includes initiating, by the processor, through a database API a search sequence across a plurality of databases for stored data matching the individual search attributes, and receiving, by the status API, a notification that the process search sequence is in progress. The method also includes constructing, by the processor, a response packet in the first database, the response back including stored data matching the individual search attributes from the plurality of databases; receiving, by the status API, a notification that the process search sequence is complete; and updating, by the status API, the tenant computing device the status as search complete. The method further includes receiving, by the status API, notification that the response packet is ready for download by the tenant computing device, and notifying the tenant computing device, by the status API, that the response packet is ready for download by the tenant computing device. The method further includes receiving, by a response API, the response packet; receiving, at the response API from the tenant computing device, a request to download the response packet; and transmitting, by the response API, to the tenant computing device, the response packet.

In a second aspect, a system for asynchronously performing search requests across a plurality of database is disclosed. The system includes a computing system including a first database, a plurality of APIs including at least a search request API, a status API, a response API, and a request processor. The computing system further includes a memory storing instructions to execute a search request which, when executed, causes the computing system to: receive a search request from a tenant computing device; transmit, by the search request API, the search request to a first database; separate the search request into individual search attributes; initiate, through the database API, a search sequence across a plurality of databases for stored data matching the individual search attributes; receive, by the status API, a notification that the process search sequence is in progress; construct a response packet in the first database, the response back including stored data matching the individual search attributes from the plurality of databases; receive, by the status API, a notification that the process search sequence is complete; update, by the status API, the tenant computing device the status of the process search sequence as search complete; receive, by the status API, notification that the response packet is ready for download by the tenant computing device; notify the tenant computing device, by the status API, that the response packet is ready for download by the tenant computing device; receive, by the response API, the response packet; receive, at the response API from the tenant computing device, a request to download the response packet for the server sent event identifier; and transmit, by the response API, to the tenant computing device, the response packet.

In a third aspect, a non-transitory computer readable medium having stored thereon instructions that cause a processor to execute a method is disclosed. The method includes receiving a search request from a tenant computing device at a search interface including a search request API, the search interface being hosted by a computing system comprising a processor, and transmitting, by the search request API, the search request to a first database. The method also includes separating, by the processor, the search request into individual search attributes. The method further includes initiating, by the processor, through a database API a search sequence across a plurality of databases for stored data matching the individual search attributes, and receiving, by the status API, a notification that the process search sequence is in progress. The method also includes constructing, by the processor, a response packet in the first database, the response back including stored data matching the individual search attributes from the plurality of databases; receiving, by the status API, a notification that the process search sequence is complete; and updating, by the status API, the tenant computing device the status of the process search sequence as search complete. The method further includes receiving, by the status API, notification that the response packet is ready for download by the tenant computing device, and notifying the tenant computing device, by the status API, that the response packet is ready for download by the tenant computing device. The method further includes receiving, by a response API, the response packet; receiving, at the response API from the tenant computing device, a request to download the response packet; and transmitting, by the response API, to the tenant computing device, the response packet.

BRIEF DESCRIPTION OF THE DRAWINGS

The same number represents the same element or same type of element in all drawings.

DETAILED DESCRIPTION

Figure 1:
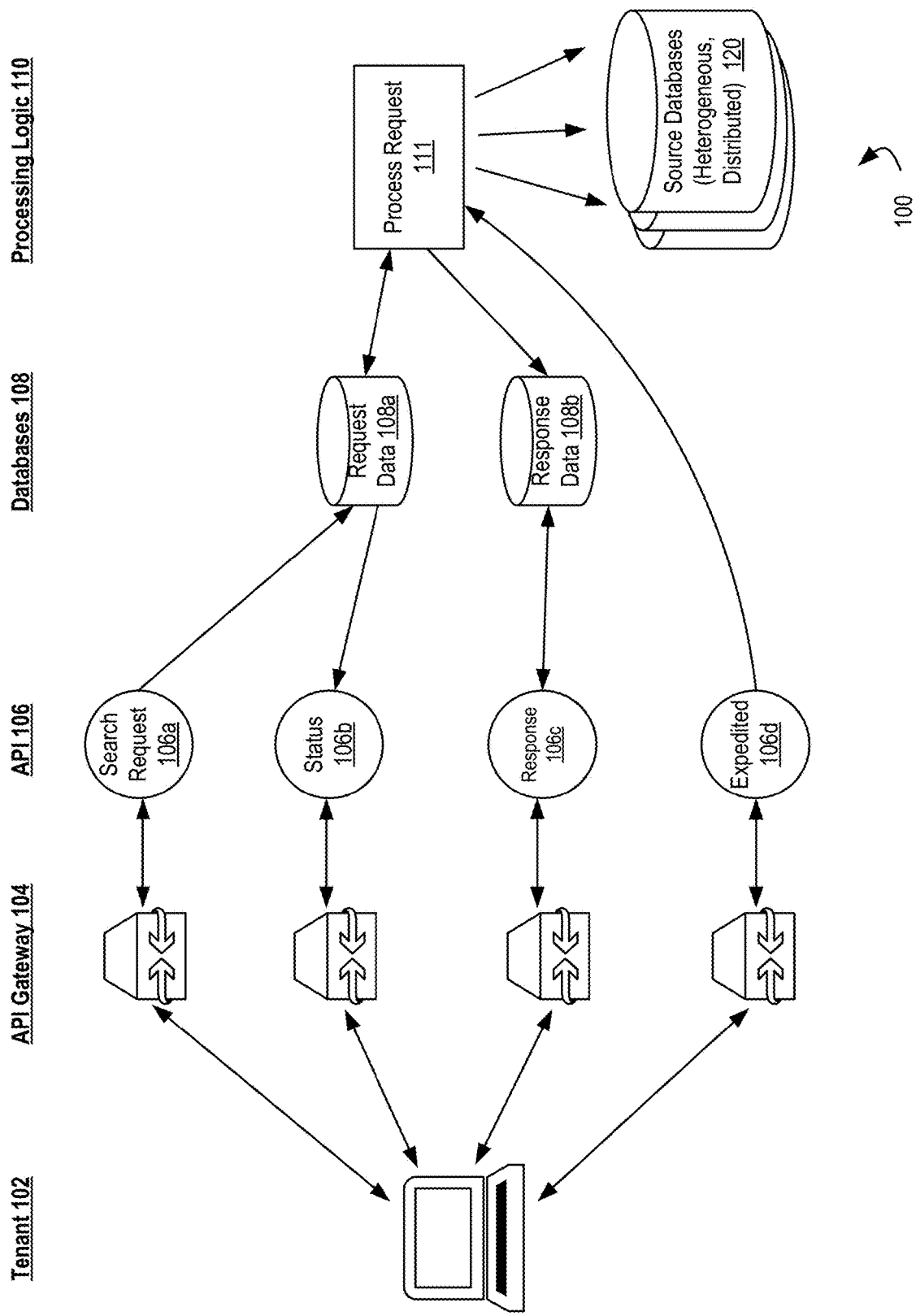
FIG. 1 illustrates an example system for accessing an enterprise customer dataset via an integrated, asynchronous access interface.

As briefly described above, embodiments of the present invention are directed to an integrated asynchronous interface for data retrieval from across a plurality of data sources. In example embodiments, an interface may include a plurality of Application Programming Interfaces (APIs) as well as a database for constructing responsive data. A search request may be decomposed at the interface to sub-search requests to be distributed to multiple data sources via a search request API. Data responsive to the sub-search requests may be aggregated at an interface database. A status API may maintain a status of the search request, and can update a tenant regarding the status of the tenant's search request. A response API may be used to provide reconstructed data responsive to the search request from the interface database to the tenant.

In example aspects, the interface may be particularly applicable in large scale data environments in which searches are performed across a plurality of unaffiliated databases and may touch a large number of records. In some implementations, customer data may be retrieved using such an interface for one customer, or multiple customers sharing a predetermined attribute or attributes. The customer data may be held in a variety of databases, such as a user profile database, a transaction database (e.g., prior purchases by the user), a contact history, and the like. Given the wide variety of databases where such data is held, the asynchronous nature of the interface, combined with the standardized APIs provided, simplify the process of obtaining such data by tenant applications.

In example aspects, the multiple databases may include, for example, sales and classification data sets stored in different databases and database types. Requests submitted to the interface are routed to appropriate APIs. The requests may be complex because they may seek information about a specific, single guest, or may be used to find a large guest audience having a particular set of attributes. The platform described herein reduces complexity for other software systems and improves overall query efficiency by reducing the processing workload required of tenant applications. Specifically, efficiencies are provided by removing the requirement that the tenant application maintain a status of its long-running query across a distributed set of data sources.

In example aspects, the APIs included in the interface can include a search request API, a status API, and a response API. Additionally, in the long term, a synchronous API may be used to access collected data. That platform can submit requests for back end processing. The request may be submitted via an attribute search to sales, identity, marketability, or classification databases. Additionally, requests may be submitted by an identifier of an individual (e.g. a customer ID, in the case of sales data being held by a retail enterprise) to obtain data associated with a single individual identity. That single individual identity may still be used to access data in each of the sales, identity, marketability, and classification databases to obtain information about that single guest.

An example query may be to obtain all customers that have sales within a particular date range for which the associated orders are store pickup orders and the guest is using a red card for payment. Such a search may require information from a large number of databases that are described above.

This solution supports a loosely coupled technology approach by minimizing the number of direct database connections across an enterprise, such as a retailer, for customer data along with a consistent use of data across retailer tenant teams. The retailer can use an API interface to access the customer data by using the APIs described herein. In particular, by decoupling the search request, process request and response along with providing a way to check on the status of a search request, the present architecture is sufficiently flexible to handle any common data request. The solution includes various ways to join data retrieved from various datasets to arrive at the current set of customer data, in a manner similar to a data join operation across database tables in a single database in SQL. While in some applications, the solution described herein is used to query customer data, in other applications it could be applied to other business needs.

The interface described here allows enterprise tenants to query and retrieve data in relatively shorter time from complex datasets. In some instances, a request from a user has a need to be fulfilled within 15 minutes of submission of the request; as such long, complex queries are unsuitable. Also, individual large data storage tables for all such data will become unwieldy, with millions of records potentially being returned in response to a request. The architecture and system described herein allows tenants to avoid an otherwise typical process of performing offline data retrieval and storage of the individual data subsets that each tenant may need to perform the queries, and analysis, that would be required to arrive at relevant customer insights.

Asynchronous Interface Architecture and Operation

Referring first to FIG. 1, an example system 100 is shown for accessing an enterprise customer dataset via an integrated, asynchronous access interface. In the example shown, the system 100 includes an API gateway 104 accessible to a tenant 102. The API gateway 104 provides access to the tenant to data stored in a plurality of underlying, disparate databases 120 via an integrated asynchronous access interface, shown as API 106. The API 106 includes a plurality of underlying APIs, including a search request API 106a, a status API 106b, and a response API 106c. In some further examples, described below, an expedited API 106d can be included as well.

In example implementations, the APIs 106a-c are interfaced to one or more interface databases 108, in the example shown including a request data collection 108a and a response data collection 108b. The request data collection 108a and response data collection 108b may be stored in separate databases or in a common database, and each may be accessed from the API 106 via an underlying database API. The database API may be selected as a matter of underlying design choice based on the type of database used to collect request data and response data; in examples, the interface databases 108 may be implemented using document-oriented data storage such as a MongoDB database.

In example embodiments, processing logic 110 includes a request processor 111. The request processor 111 executes underlying data retrieval processes based on information stored in the request data collection 108a, and places that data in the response data collection 108b. In example embodiments, the request processor may decompose a specific query into sub-queries or attribute-specific queries for submission to individualized, underlying databases 120. The underlying databases 120 may store unique datasets, but which may have a common attribute that identify data to be retrieved. In some examples, the common attribute may be an attribute of an individual or a group of individuals. The plurality of databases, 120, and for example particular databases 122-128 below, individually store at least some of the data included in these search attributes.

In operation, the APIs 106a-c operate to process a request from a tenant, such as tenant 102. The search API 106a may receive the request from the tenant, and store the request in request data collection 108a. The search API 106a may assign the request a unique identifier, and the status API 106b may generate a server sent event status as "in progress". In examples, server sent event status messages may be returned from the status API 106b to the tenant 102 via gateway 104b. The search API 106a and/or status API 106b may, in some cases, respond to a tenant (via gateways 104a or 104b) with the unique identifier to allow the tenant to later query the status API 106b to obtain current status of the submitted request. Generally speaking the server sent event may be associated with an identifier (e.g., a "server sent event identifier"), such as a unique code that corresponds to the search request. The unique code may be generated by either the search request API 106a at the time the request is received, or may be generated by the status API 106b at that time or thereafter. The unique code may be used by the tenant computing device in subsequent status requests to the status API 106b to monitor the status of the search request.

Once the request is provided to the request data collection 108a, the request processor 111 may decompose the request into sub-requests that are formatted to the particular schema and database type of each underlying database 120. The request processor 111 then returns data received in response to the sub-requests in the response data collection 108b, thereby reconstructing an overall dataset. In some implementations, the request processor 111 comprises a stand-alone application that manages submission of sub-requests to databases 120, and builds response packets from returned data. In examples, the request processor 111 may manage retries upon failure of a sub-request (e.g., not receiving response data within 1-5 minutes) to minimize errors returned to the tenant. Once all sub-requests have been returned, a complete response may be formulated. The status API 106b may update a status of the query to be "completed" (or "error" if some malfunction occurred, or fewer than all sub-requests are fulfilled), and an updated notice may be sent to the tenant 102. In response to the updated notice, at a later time, the tenant 102 may submit a request to the API 106 to obtain data, and the response API 106c may return the reconstructed dataset to the tenant in response.

In some embodiments, expedited API 106d provides a synchronous interface to the request processor 111. In some example embodiments in which the expedited API 106d is included, data requests may be submitted directly to the request processor rather than staging a request in interface databases 108. In such instances, a data request may be fulfilled in nearer realtime.

In some examples, data requests routed to the API 106 may be routed to the expedited API 106d, or to the APIs 106a-c, based on the complexity of the data request. For example, a request submitted to obtain data associated with a single individual may be submitted to the API 106d, since it is more likely that the request may be able to be fulfilled, even from a large number of distributed databases 120, in near-realtime. However, a request submitted to obtain data associated with a larger number of individuals (e.g., based on an attribute common among a set of individuals) may be unlikely to be completely fulfilled from databases 120 in near-realtime, so the search request API 106a, status API 106b, and response API 106c may be used (alongside database API as described above).

In examples, the data stored in response data collection 108b may be compressed for transmission to a tenant 102. For example, a formulated response packet may be zipped prior to transmission, since, in some instances, over a hundred million guest records may be returned in response to a request. In some examples, a gateway 104c may be used to rate limit response data returned to tenant 102 for stability purposes.

Referring to the API 106 generally, it is noted that each of the search request API 106a, the status API 106b, and the response API 106c are asynchronous APIs, in that they do not provide immediate response to requests, but rather are triggered for further processing. In particular, the search request API 106a may transmit the initial search request for back-end processing, and the status API 106*b* transmits status of the search request when a status request is received that identifies the search request using a server sent event identifier, or identifier for the request. Still further a database API or data platform API may be used to transmit individual searches to a plurality of underlying databases based on search attributes, and returns matched data into storage accessible by the computing system that implements the API. Furthermore, the response API 106*c* transmits the response packet to the tenant computing device in response to a request, and via gateway 104*c* once the response has been constructed.

Figure 2:
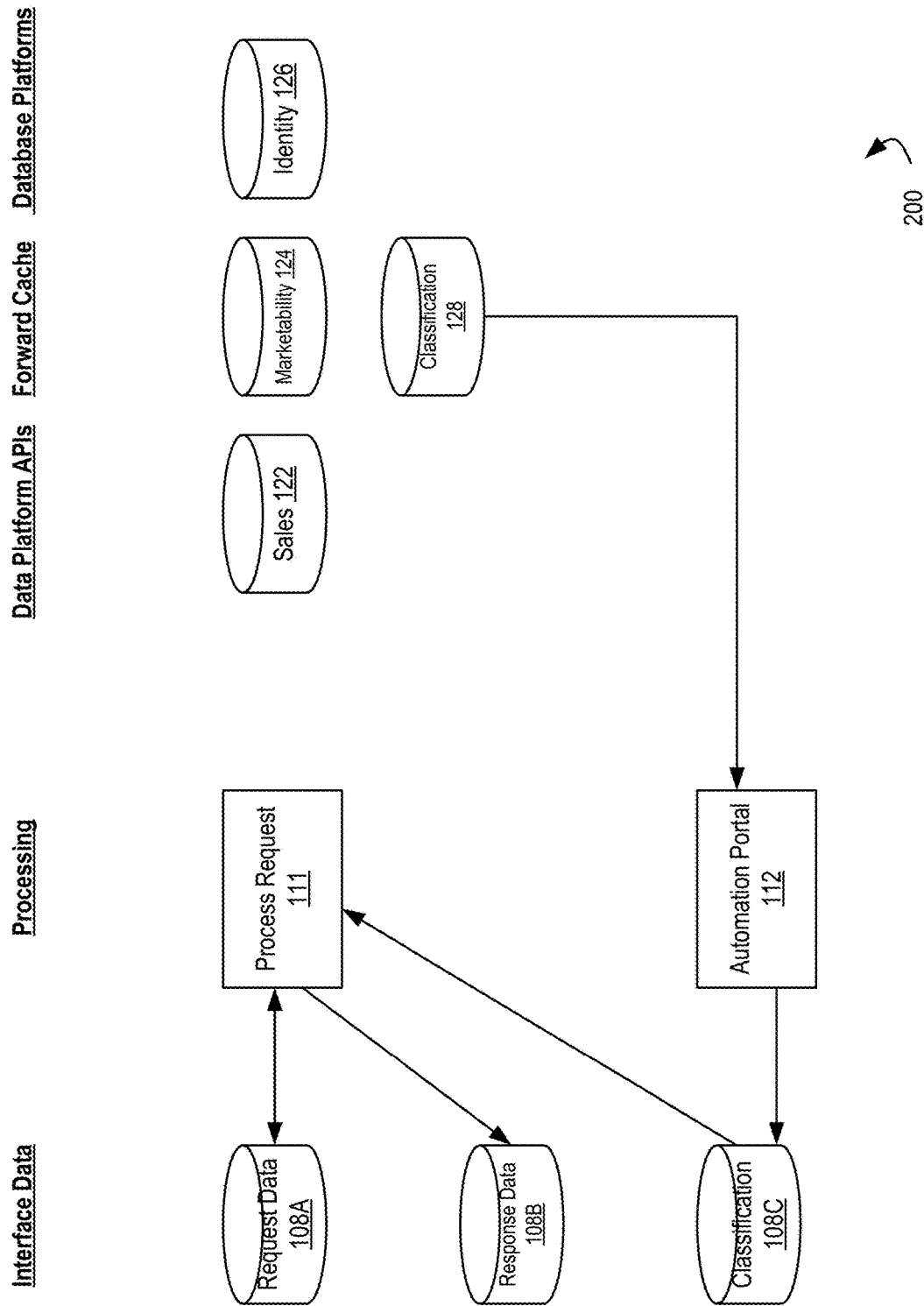
FIG. 2 illustrates an example underlying architecture for an integrated asynchronous access interface useable within the context of FIG. 1.

Referring now to FIG. 2, an example underlying architecture 200 is shown that may be utilized as a portion of an integrated asynchronous access interface useable within the context of FIG. 1. In the example shown, the architecture 200 illustrates one possible implementation of the request processing from the request data collection 108*a* to provide data to the response data collection 108*b*.

In the example shown, the request processor 111 may retrieve request data from the request data collection 108*a*. The request processor 111 may then decompose the request to form sub-requests, for example based on a classification of underlying data sources in a classification database 108*c* (e.g., representing a map of individual attributes available to be queried).

In some instances, the request processor 111 may receive requests in the form of a feed item query language (FIQL), and may construct structured query language (SQL) queries of underlying databases based on the received FIQL request. In example further instances, requests may be constructed to include queries as well as logic for managing failed or successful requests. For example, in the instance of a failed request, one or more retries may be performed within a predetermined number of time or predetermined number of retries, to reduce error rates.

At this stage, because the request has been decomposed to sub-requests that are able to be submitted to underlying databases (e.g., by matching a database format and consistent with the schema), the sub-requests may be submitted to underlying databases by an automation portal 112, which may trigger submission of requests and monitor/manage underlying submissions to ensure that such sub-requests are submitted and data returned successfully. In example embodiments, the automation portal 112 may be implemented using a business process automation portal, such as is described in U.S. Pat. No. 10,922,145, the disclosure of which is hereby incorporated by reference in its entirety.

In the example shown, a wide variety of underlying databases may be searched via the sub-requests, and in this example, the underlying databases are specific to individual data, such as customer data. In the specific example shown, the underlying databases include sales data 122, marketability data 124, identity data 126, and classification data. Each of these types of data may be stored differently, using different schemas and database structures, and may include different portions of an individual's "identity" as known to an organization. For example, sales data may be stored as transactional data tied to a particular individual in a transactional database, while classification data 128 may be stored in a relational database or big data (e.g., Hadoop) data storage system which may provide differing levels of read or query processing times.

In use, the requests may involve requests for data from a particular individual. For example, the requests may include a specific individual identifier, such as a customer ID assigned to the user by a retail enterprise. The requests may also include an attribute of multiple individuals, and information may be sought regarding all individuals having such an attribute. By decomposing a request to sub-requests, and automating the underlying sub-requests, responsive data may then be recompiled in the response data collection 108*b*.

In the example shown, various underlying platform services may be utilized in submitting and fulfilling requests and sub-requests. In particular, the automation portal 112 may utilize one or more data platform APIs and a forward cache to access the various database platforms on which databases 122-128 are hosted. Data platform APIs may similarly be referred to as database APIs, in addition to APIs that may be used to access databases 108*a-c*.

Figure 3:
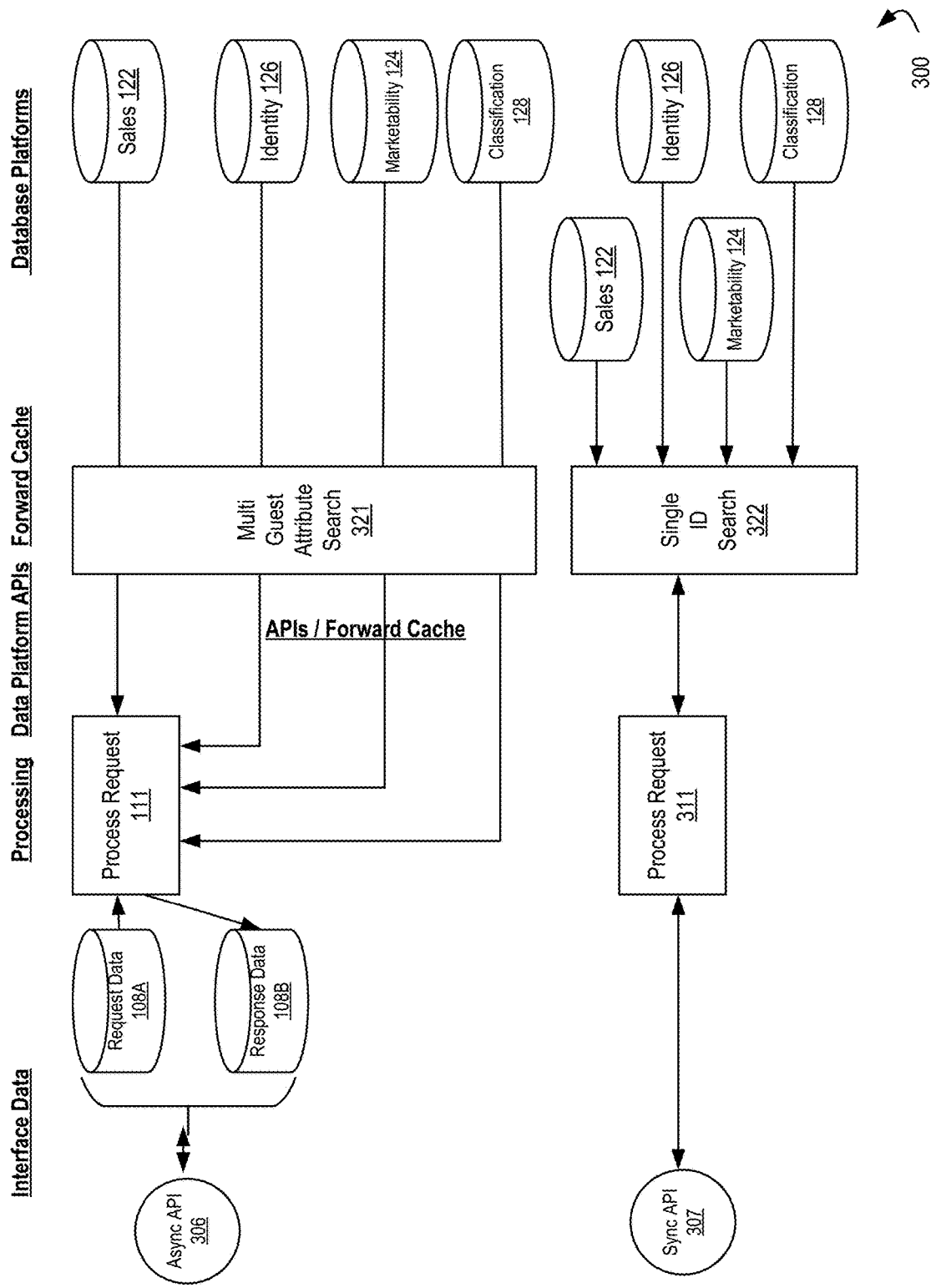
FIG. 3 illustrates a second example underlying architecture for an integrated asynchronous access interface useable within the context of FIG. 1.

Referring to FIG. 3, a further example implementation is shown of an underlying architecture 300 for an integrated asynchronous access interface useable within the context of FIG. 1. The architecture 300 provides some improved functionality and flexibility as compared to architecture 200, in particular because a copy of the data would not need to be staged before joining to other data.

In the example shown, requests that are received may be routed to either an asynchronous API 306 or a synchronous API 307. The asynchronous API 306 corresponds generally to API 106 described above, and in particular may incorporate APIs such as APIs 106*a-c* previously described. Synchronous API 307 may correspond, for example, to the expedited API 106*d* of FIG. 1.

In the example shown, the asynchronous API 306 provides an interface to the request data collection 108*a* and response data collection 108*b*, which interface to a request processor 111 as described previously. However, in this example, rather than routing to a classification database 108*c* for processing by automation portal 112, a multi-guest attribute search service 321 is supported by data platform APIs and/or a forward cache of a customer data service, and provides access to various databases, such as a sales database 122, a marketability database 124, an identity database 126, and a classification database 128. The multi-guest attribute search service 321 processes asynchronous queries and caches data for the request processor 111 from databases 122-128, and in some instances joins the data within the forward cache and data platform APIs of the customer data platform, e.g., prior to being returned to database 108*b* by the request processor 111.

The synchronous API 307 routes requests to a request processor 311, which is interfaced to a single individual search service 322. The single individual search service 322 can search databases 122-128, and perform joins within the data platform APIs and/or a forward cache of a customer data service prior to response via request processor 311 to the synchronous API 307 (and then to tenant 102). Accordingly, in the case of customer data, individual customer requests may be handled in a synchronous manner, while requests for customer data from all customers satisfying one or more attributes may be handled asynchronously. In both instances, in FIG. 3, joins may be performed either at request processors 111, 311 or at search services 321, 322.

Figure 4:
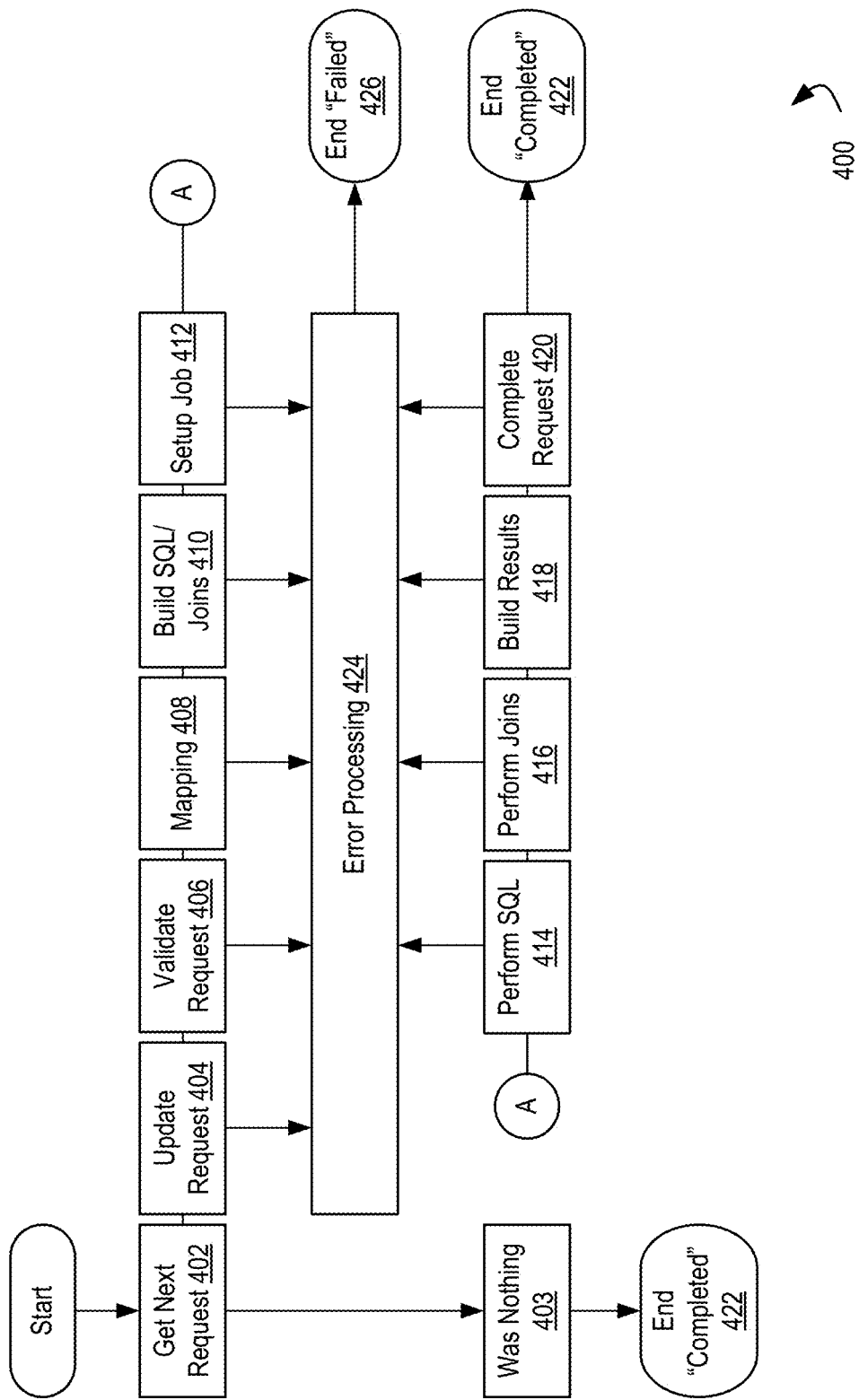
FIG. 4 illustrates a process flow architecture for the integrated asynchronous access interfaces of FIGS. 3-4.

FIG. 4 illustrates a process flow architecture 400 for the integrated asynchronous access interfaces of FIGS. 1-4. The process flow architecture 400 is able to be used with any of the systems or architectures above, for requests for either individual data or data from a plurality of individuals having shared attribute(s).

In the example shown, the process flow is started, and a next request to be processed is handled (operation 402). If there was no request (operation 403), the overall process flow may end with a "completed" status (operation 422). If there is an outstanding request, the request will be updated (operation 404) and validated to determine that the request has a proper format and addresses valid data (operation 406). A mapping operation maps the request to one or more underlying databases (operation 408). For example, a particular request for a specified attribute (e.g., customers who purchased a particular item or items at a particular store within the last period of time using a specific credit card) may have those attributes mapped to underlying databases (e.g., at least a sales database 122 and identity database 126, in this example). Specific queries and joins are defined to allow separate queries, or sub-requests, to be made to underlying databases and to rejoin that data upon return (e.g., at a customer data service, or within a staging database) (operation 410). The mapping operation and creation of queries and joins may be performed, in some instances, by a request processor, such as request processors 111, 311, of FIGS. 1-4.

In the example shown, once a job is setup including sub-requests, operation continues by executing queries on relevant underlying databases (operation 414). This may include executing the SQL queries that were previously mapped to databases and formulated in operations 408-412. As data is received in response to queries, joins of the data may be performed (operation 416) and a results set may be built (operation 418). The results set may be built, for example, in a response data collection 108b. The request may then be indicated as completed (operation 420), and a message indicating an updated status communicated to a tenant so that tenant may subsequently request and retrieve the requested data. Accordingly, a "completed" end status may be set (operation 422), for example by request processors 111, 311.

In the example shown, an error processing module 424 may receive an indication of errors from any of operations 404-412 or 414-420. The error processing module 424 may direct re-execution of a particular one or more operations, or if the error is not recoverable, may indicate an updated "failed" end state (operation 426).

Referring to FIG. 4 overall, the operations included in the process flow architecture 400 may be separated into two different, scheduled jobs which may be executed on a predetermined schedule or cadence. In one example implementation, operations 402-412 are performed as an initial, static job. This job may be continued until a failure occurs (e.g., a failed build of a SQL query and/or join), at which time a job status of "failed" may be set. Furthermore, operations 414-420 may be performed as part of a second, dynamic job. This second job may be called upon completion of the first job, and may end in either a "completed" or "failure" state, as noted above.

Methods of Operation

Figure 5:
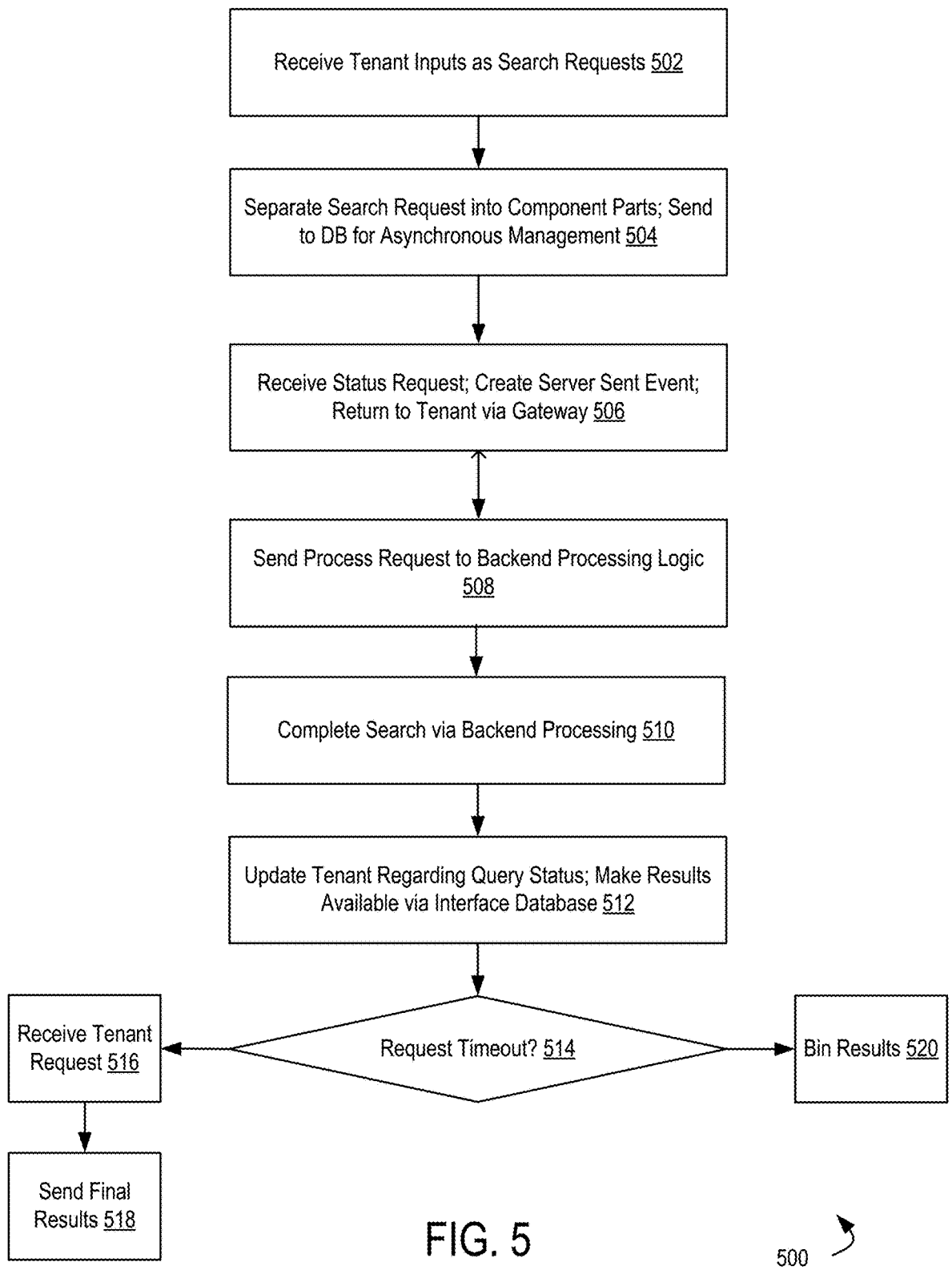
FIG. 5 illustrates a flowchart of a method of operation of an integrated asynchronous access interface in response to a user request for customer data, in accordance with aspects of the present disclosure.
Figure 6:
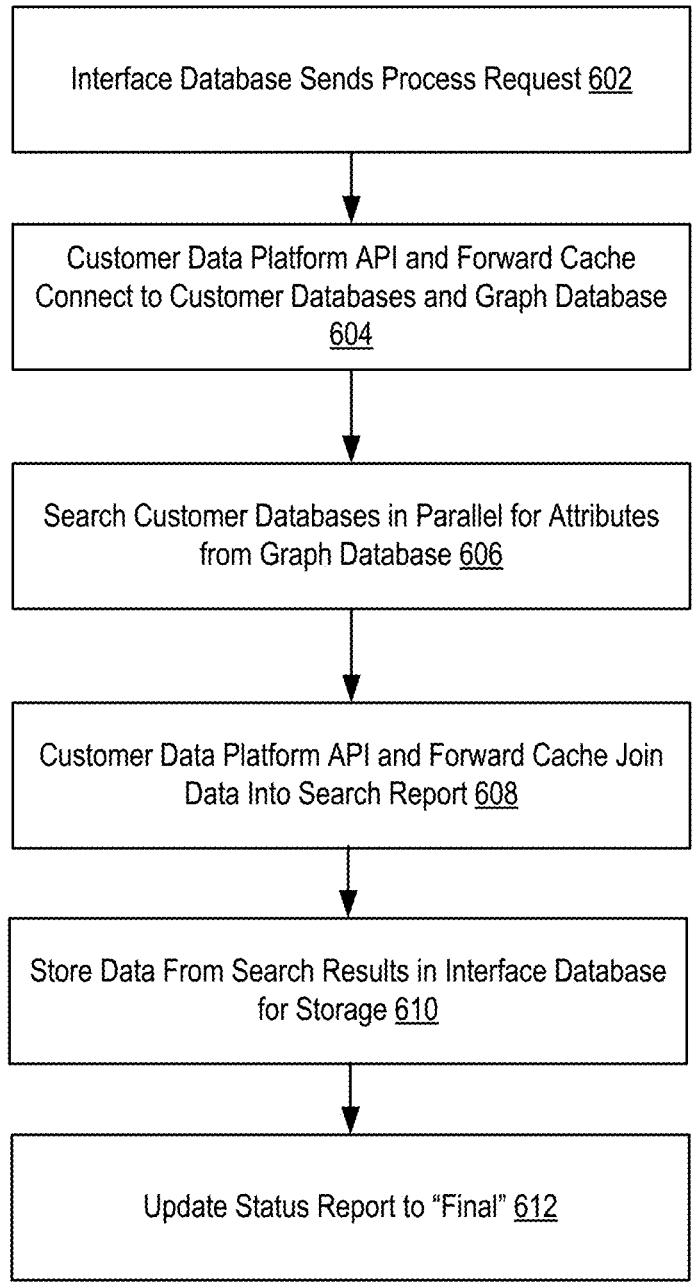
FIG. 6 illustrates a flowchart of a method for processing a request for customer data associated with specific customer attributes.
Figure 7:
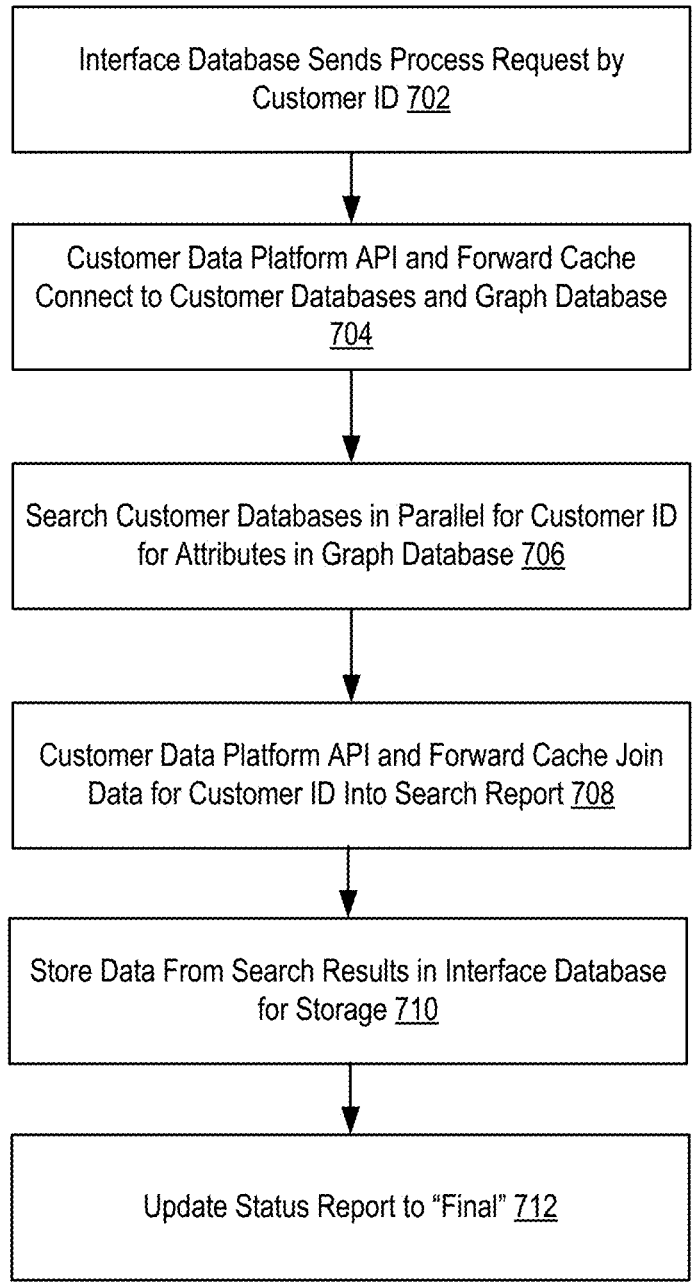
FIG. 7 illustrates a flowchart of a method for processing a request for customer data associated with a particular customer identity.

Referring to FIGS. 5-7, various methods of operation of an integrated asynchronous access interface are described, in conjunction with the systems and system architectures described above in conjunction with FIGS. 1-4. In particular, the methods may be performed at the interface, or at least partially within an underlying customer data service, as described above.

FIG. 5 illustrates a flowchart of a method 500 of operation of an integrated asynchronous access interface in response to a user request for customer data, in accordance with aspects of the present disclosure. The method 500 is performed, for example, by a combination of the API 106 (including related APIs 106a-c) and related gateways 104, in addition to request processors 111, 311, and other underlying services of a customer data service. The method 500 includes steps 502-520.

In the example shown, the method 500 included receiving tenant inputs as search requests (step 502). The tenant inputs can identify one or more attributes of individuals to be searched, or may include a single individual identifier. The choice of which type of request is based on the specific type of operation to be performed by the tenant with that individual data to be received (step 504). This may be performed by request processor 111 based on data in the request data collection 108a.

In the example shown, the search request may be separated into component parts, for example via the mapping and query building operations 408, 410 described above in conjunction with FIG. 4, and performed by request processors 111, 311 as previously described. In the example shown, an API, such as status API 106b, may be configured to receive status requests from a tenant, such as tenant 102; the status API 106b will create a server sent event and optionally, return that event to a tenant, for example tenant 102 via gateway 104b in response to such a request (step 506). Once "sent" to the server, backend processing logic may be employed to process the query requests and joins that are created (step 510). For example, an automation portal 112 and associated classification database 108c, or a set of search services 321, 322 at a customer data service may be used to process subqueries and construct a complete dataset. That complete dataset may be stored in an interface database, e.g., in response data collection 108b.

In the example shown, the method 500 further includes updating a tenant, such as tenant 102, regarding the query status of the submitted request (step 512). The query status may be indicated as "error", or "complete" at this stage. If complete, a response API 106c may monitor an available response dataset that is accessible, via a request, from a tenant. If a request is received (step 516) prior to a timeout (at operation 514), final results may be sent via the response API 106c and gateway 104c to the tenant (step 518). As noted above, gateway 104c may monitor and control a rate of data transmission (optionally, based on the size of the response data to be transmitted) to the tenant to ensure platform stability.

If no request for the response data is received from the tenant 102 within a predetermined period of time (e.g., 15-60 minutes, or some other configurable period of time), the results may be discarded (step 520).

FIG. 6 illustrates a flowchart of a method 600 for processing a request for customer data associated with specific customer attributes. The method 600 may be performed by underlying support services upon being provided with a request from the API 106, as described above.

In the example shown, the method 600 includes receiving an indication that the API 106 has received a search process request (step 602), which may include monitoring a request data collection 108a, or otherwise receiving a notification from the request API 106a. The data platform API and/or forward cache of the customer data service may connect to various customer databases, and optionally a graph database indicating locations of data within such customer databases by attribute, to retrieve relevant data for, in this case, a group of individuals or customers having a shared one or more attributes (step 604). The graph database may include, for example, individual search attributes such as one or more of sales data, classification data, marketability, retailer card status, purchase history, a typical shopping location, a search history, a purchase history, a time, a specific date, a date range, a shopping location either in-store or online, pick-up procedure, repetition of item searched, repetition of item purchased, or a guest identity.

In the example shown, the relevant databases are queried (databases 120 generally, or in the case of customer data, any or all of databases 122-128) for records having the attributes of concern in the request (step 606). The customer data platform API and/or forward cache join data returned in response to the queries of step 606 into a search report (step 608). The responsive data may be transmitted from the customer data platform API to a database of the interface for storage and retrieval by the tenant (step 610). For example, the responsive data may be optionally formulated as a search report or as a dataset, and may be transmitted to and stored within a response data collection 108b, for example, for a predetermined period until retrieved or until a timeout occurs. A status of the search report may be set to "final", indicating that the response API 106c and/or status API 106b may notify the tenant via gateways 104b-c that the report is ready to be retrieved in response to a tenant request.

FIG. 7 illustrates a flowchart of a method 700 for processing a request for customer data associated with a particular customer identity. Generally, the method 700 is analogous to the method 600, but may be performed either asynchronously or synchronously because the request only identifies records for a single individual (e.g., records for a single customer).

In the example shown, the method 700 includes an interface database (e.g., request data collection 108a) sending a process request to back-end services, such as a request processor 111, 311, including a specific individual identifier, such as a customer ID (step 702). The customer data platform, via a customer data platform API and/or forward cache, connect to customer databases and a graph database (databases 120, or 122-128 generally) (step 704), and the customer databases are searched in parallel for a customer ID that matches the identified ID included in the request (step 705). Data from the various databases may then be joined, for example by the request processor 111, 311 and/or services 321, 322 (step 708), thereby forming a search report for the individual customer ID. The search report may then be transmitted from the customer data platform API to an interface database (e.g., response data collection 108b) for storage (step 710). A status may be updated to indicate that response dataset is now "final" (step 712), such that a status API 106b and/or response API 106c may notify a tenant that the search report is ready and can be queried and retrieved from the response data collection 108b.

Notably, while the method 600 is typically performed asynchronously, method 700 may be performed either synchronously or asynchronously, and may be set to do either based on, e.g., the anticipated volume of records associated with an individual and the need for realtime or near-realtime data.

Computing System

Figure 8:
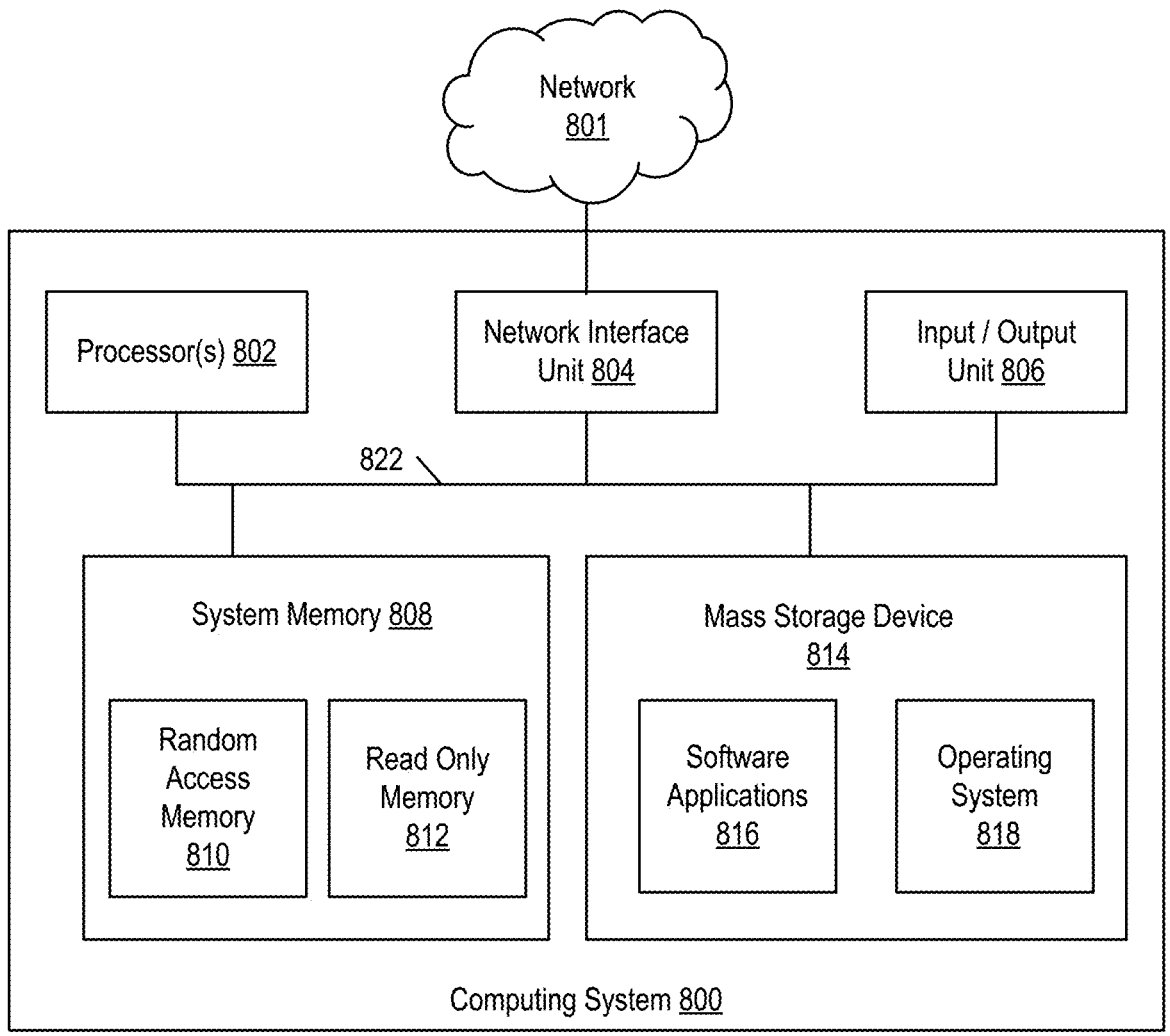
FIG. 8 illustrates an example block diagram of a computing system.

FIG. 8 illustrates an example block diagram of a virtual or physical computing system 800. One or more aspects of the computing system 800 can be used to implement aspects of the system 100, for example to implement the API 106, request processor(s) 111, 311, store instructions described herein, and perform operations described herein.

In the embodiment shown, the computing system 800 includes one or more processors 802, a system memory 808, and a system bus 822 that couples the system memory 808 to the one or more processors 802. The system memory 808 includes RAM (Random Access Memory) 810 and ROM (Read-Only Memory) 812. A basic input/output system that contains the basic routines that help to transfer information between elements within the computing system 800, such as during startup, is stored in the ROM 812. The computing system 800 further includes a mass storage device 814. The mass storage device 814 is able to store software instructions and data. The one or more processors 802 can be one or more central processing units or other processors.

The mass storage device 814 is connected to the one or more processors 802 through a mass storage controller (not shown) connected to the system bus 822. The mass storage device 814 and its associated computer-readable data storage media provide non-volatile, non-transitory storage for the computing system 800. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 800.

According to various embodiments of the invention, the computing system 800 may operate in a networked environment using logical connections to remote network devices through the network 801. The network 801 is a computer network, such as an enterprise intranet and/or the Internet. The network 801 can include a LAN, a Wide Area Network (WAN), the Internet, wireless transmission mediums, wired transmission mediums, other networks, and combinations thereof. The computing system 800 may connect to the network 801 through a network interface unit 804 connected to the system bus 822. It should be appreciated that the network interface unit 804 may also be utilized to connect to other types of networks and remote computing systems. The computing system 800 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the computing system 800 can store software instructions and data. The software instructions include an operating system 818 suitable for controlling the operation of the computing system 800. The mass storage device 814 and/or the RAM 810 also store software instructions, that when executed by the one or more processors 802, cause one or more of the systems, devices, or components described herein to provide functionality described herein. For example, the mass storage device 814 and/or the RAM 810 can store software instructions that, when executed by the one or more processors 802, cause the computing system 800 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of a specific data retrieval API and underlying or back-end services, the techniques disclosed herein are applicable to data retrieval techniques generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method for asynchronously performing search requests across a plurality of databases, the method comprising:
    receiving a search request from a tenant computing device at a search interface including a search request API, the search interface being hosted by a computing system comprising a processor;
    transmitting, by the search request API, the search request to a first database;
    creating, by a status API, a server sent event;
    identifying, by the processor, a plurality of search attributes in the search request;
    mapping, by the processor, each search attribute of the plurality of search attributes to a corresponding database of a plurality of databases;
    generating a plurality of sub-search requests by, for each search attribute of the plurality of search attributes, generating a sub-search request to query the corresponding database for data matching the search attribute;
    initiating, by the processor, through a database API a search sequence comprising the plurality of sub-search requests;
    receiving, by the status API, a notification that the search sequence for the server sent event identifier is in progress;
    constructing, by the processor, a response packet in the first database, the response packet including stored data matching the plurality of search attributes from the plurality of databases;
    receiving, by the status API, a notification that the search sequence is complete;
    updating, by the status API, the status of the search sequence as complete;
    receiving, by the status API, a notification that the response packet is ready for download by the tenant computing device;
    notifying the tenant computing device, by the status API, that the response packet is ready for download by the tenant computing device;
    receiving, by a response API, the response packet;
    receiving, at the response API from the tenant computing device, a request to download the response packet; and
    transmitting, by the response API, to the tenant computing device, the response packet.

2. The method of claim 1, further comprising transmitting, by the status API, to the tenant computing device the server sent event in response to a request for status received from the tenant computing device.

3. The method of claim 1, wherein a first search attribute of the plurality of search attributes is one or more retail customers;
    wherein a second search attribute of the plurality of search attributes is purchases of a retail item;
    wherein mapping, by the processor, each search attribute of the plurality of search attributes to the corresponding database of a plurality of databases comprises:
        mapping the one or more retail customers to an identity database; and
        mapping purchases of a retail item to a sales database; and
    wherein generating the plurality of sub-search requests by, for each search attribute of the plurality of search attributes, generating a sub-search request to query the corresponding database for data matching the search attribute comprises:
        generating a first sub-search request to query the identity database for data matching the one or more retail customers; and
        generating a second sub-search request to query the sales database for data matching the purchases of the retail item.

4. The method of claim 1, wherein the server sent event identifier comprises a unique code corresponding to the search request which is used by the tenant computing device to monitor the status of the search request.

5. The method of claim 1, wherein each of the search request API is an asynchronous API that transmits the initial search request.

6. The method of claim 1, wherein the status API is an asynchronous API that transmits the status of the search request by referencing the server sent event.

7. The method of claim 1, wherein the database API is an asynchronous API that transmits each search attribute of the plurality search attributes to the corresponding database of the plurality of databases and then communicates data matching the plurality of search attributes to the processor.

8. The method of claim 1, wherein the response API is an asynchronous API that transmits the response packet to the tenant computing device from the processor.

9. The method of claim 1, wherein the plurality of databases individually store at least some of the data included in the plurality of search attributes.

10. A system for asynchronously performing search requests across a plurality of databases, the system comprising:
a computing system including:
a first database;
a plurality of asynchronous APIs including at least a search request API, a status API, a response API, and a database API; and
a processor; and
a memory storing instructions to execute a search request which, when executed, causes the computing system to:
receive a search request from a tenant computing device;
transmit, by the search request API, the search request to a first database;
create, by the status API, a server sent event;
separate the search request into individual search attributes;
identify, by the processor, a plurality of search attributes in the search request;
map, by the processor, each search attribute of the plurality of search attributes to a corresponding database of a plurality of databases;
generate a plurality of sub-search requests by, for each search attribute of the plurality of search attributes, generating a sub-search request to query the corresponding database for data matching the search attribute;
initiate, through the database API, a search sequence comprising the plurality of sub-search requests;
receive, by the status API, a notification that the process search sequence is in progress;
construct a response packet in the first database, the response packet including stored data matching the plurality of search attributes from the plurality of databases;
receive, by the status API, a notification that the search sequence is complete;
update, by the status API, the status of the process search sequence as complete;
receive, by the status API, notification that the response packet is ready for download by the tenant computing device;
notify the tenant computing device, by the status API, that the response packet is ready for download by the tenant computing device;
receive, by the response API, the response packet;
receive, at the response API from the tenant computing device, a request to download the response packet; and
transmit, by the response API, to the tenant computing device, the response packet.

11. The system of claim 10, further comprising the tenant computing device.

12. The system of claim 10, further comprising the plurality of databases.

13. The system of claim 10, wherein the plurality of search attributes further comprise one or more of sales data, classification data, marketability, retailer card status, purchase history, a typical shopping location, a search history, a purchase history, a time, a specific date, a date range, a shopping location either in-store or online, pick-up procedure, repetition of item searched, repetition of item purchased, and/or a guest identity.

14. The system of claim 10, wherein the server sent event includes a unique code corresponding to the search request which is used by the tenant computing device to monitor the status of the search request.

15. The method of claim 10, wherein the plurality of databases individually store at least some of the data included in the plurality of search attributes.

16. The system of claim 15, wherein the plurality of search attributes include at least one of an attribute common among a plurality of individuals or a unique identifier of an individual.

17. A non-transitory computer readable medium having stored thereon instructions that cause a processor to execute a method, the method comprising:
receiving a search request from a tenant computing device at a search interface including a search request API, the search interface being hosted by a computing system comprising a processor;
transmitting, by the search request API, the search request to a first database;
creating, by a status API, a server sent event;
identifying, by the processor, a plurality of search attributes in the search request;
mapping, by the processor, each search attribute of the plurality of search attributes to a corresponding database of a plurality of databases;
generating a plurality of sub-search requests by, for each search attribute of the plurality of search attributes, generating a sub-search request to query the corresponding database for data matching the search attribute;
initiating, by the processor, through a database API a search sequence comprising the plurality of sub-search requests;
receiving, by the status API, a notification that the search sequence is in progress;
constructing, by the processor, a response packet in the first database, the response packet including stored data matching the plurality of search attributes from the plurality of databases;
receiving, by the status API, a notification that the search sequence is complete;
updating, by the status API, the status of the search sequence as complete;
receiving, by the status API, notification that the response packet is ready for download by the tenant computing device;
notifying the tenant computing device, by the status API, that the response packet is ready for download by the tenant computing device;
receiving, by a response API, the response packet;
receiving, at the response API from the tenant computing device, a request to download the response packet; and
transmitting, by the response API, to the tenant computing device, the response packet.

18. The non-transitory computer readable medium of claim 17, wherein the plurality of search attributes further comprise one or more of sales data, classification data, marketability, retailer card status, purchase history, a typical shopping location, a search history, a purchase history, a time, a specific date, a date range, a shopping location either in-store or online, pick-up procedure, repetition of item searched, repetition of item purchased, and/or a guest identity.

19. The non-transitory computer readable medium of claim 17, wherein the server sent event includes a unique code corresponding to the search request which is used by the tenant computing device to monitor the status of the search request.

20. The non-transitory computer readable medium of claim 17, wherein the plurality of databases individually store at least some of the data included in the plurality of search attributes.

\* \* \* \* \*